(12) United States Patent
Hamels et al.

(10) Patent No.: US 8,141,898 B2
(45) Date of Patent: Mar. 27, 2012

(54) AIRBAG MODULE WITH AN AIRBAG AND A TUBULAR GAS GENERATOR THAT CAN BE FASTENED TO A MODULE HOUSING

(75) Inventors: Stefan Hamels, Aschaffenburg (DE);
Tobias Fechner, Aschaffenburg (DE);
Frank Gross, Aschaffenburg (DE);
Christian Kempe, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 13/051,940

(22) Filed: Mar. 18, 2011

(65) Prior Publication Data

US 2011/0163522 A1    Jul. 7, 2011

Related U.S. Application Data

(63) Continuation of application No. PCT/EP2009/063869, filed on Oct. 18, 2009.

(30) Foreign Application Priority Data

Nov. 7, 2008   (DE) .......................... 10 2008 056 946

(51) Int. Cl.
*B60R 21/20* (2011.01)
(52) U.S. Cl. ................................... 280/728.2
(58) Field of Classification Search ............... 280/728.2, 280/731, 732; 285/325, 82, 91; 403/289, 403/344
See application file for complete search history.

(56) References Cited

U.S. PATENT DOCUMENTS

| 5,257,815 A * | 11/1993 | Bachelder et al. ......... 280/728.2 |
| 5,356,175 A | 10/1994 | Rose et al. |
| 5,454,588 A | 10/1995 | Rose |
| 5,458,362 A | 10/1995 | Buchanan et al. |
| 5,487,556 A | 1/1996 | Jenkins et al. |
| 5,556,124 A | 9/1996 | Olson |
| 5,577,764 A | 11/1996 | Webber et al. |

(Continued)

FOREIGN PATENT DOCUMENTS

DE         42 33 751 A1      4/1994

(Continued)

OTHER PUBLICATIONS

Notification of International Preliminary Report on Patentability (IPRP) in PCT/EP2009/063869 dated May 19, 2011.

(Continued)

*Primary Examiner* — Joseph Rocca
(74) *Attorney, Agent, or Firm* — Foley & Lardner LLP

(57) ABSTRACT

An airbag module with an airbag and a tubular gas generator fastened to a module housing is provided. Said tubular gas generator having gas outlet openings along the periphery thereof and can be fastened to the module housing by means of only a clamping ring that is movable over the tubular gas generator and over a section of the module housing. The clamping ring has in axial direction elongated sections being separated from each other and continuing axial in the opposite direction. The module housing has in its bottom an opening for inserting the tubular gas generator, wherein on the module housing below this opening a support for the tubular gas generator is provided. The clamping ring is designed such that said clamping ring reaches below the support after positioning the tubular gas generator with the elongated section by axial moving in direction of the center of the tubular gas generator.

15 Claims, 10 Drawing Sheets

U.S. PATENT DOCUMENTS

| | | | |
|---|---|---|---|
| 5,582,423 A | 12/1996 | Rion et al. | |
| 5,611,563 A | 3/1997 | Olson et al. | |
| 5,620,200 A | 4/1997 | Garner et al. | |
| 5,687,988 A * | 11/1997 | Storey et al. | 280/728.2 |
| 5,692,768 A | 12/1997 | Mihm et al. | |
| 5,735,542 A | 4/1998 | Bohn | |
| 5,810,386 A | 9/1998 | Kelley et al. | |
| 5,813,707 A | 9/1998 | Bohn | |
| 5,816,607 A * | 10/1998 | Bugdaci et al. | 280/728.2 |
| 5,887,891 A | 3/1999 | Taquchi et al. | |
| 6,056,313 A | 5/2000 | Lutz et al. | |
| 6,283,497 B1 | 9/2001 | Zimmerbeutel et al. | |
| 6,361,064 B1 * | 3/2002 | Hopf et al. | 280/728.1 |
| 7,040,647 B2 | 5/2006 | Deligny et al. | |
| 7,354,078 B2 * | 4/2008 | Yoshino | 285/319 |
| 7,784,817 B2 | 8/2010 | Choi et al. | |
| 7,806,429 B2 | 10/2010 | Fangmann et al. | |
| 7,810,848 B2 * | 10/2010 | Yoshino | 285/305 |
| 7,976,062 B2 * | 7/2011 | Fechner et al. | 280/741 |
| 2002/0024197 A1 | 2/2002 | Thomas et al. | |
| 2004/0100071 A1 | 5/2004 | Chavez et al. | |
| 2005/0110246 A1 | 5/2005 | Schneider | |
| 2005/0225058 A1 | 10/2005 | Braun | |
| 2007/0108752 A1 | 5/2007 | Eckert et al. | |
| 2007/0284858 A1 * | 12/2007 | Nishimura et al. | 280/729 |
| 2007/0284862 A1 * | 12/2007 | Kashiwagi | 280/740 |
| 2008/0007037 A1 | 1/2008 | Sauer | |
| 2008/0023944 A1 | 1/2008 | Dargavell et al. | |
| 2008/0129019 A1 | 6/2008 | Fangmann et al. | |
| 2008/0238044 A1 * | 10/2008 | Wagener et al. | 280/728.2 |
| 2009/0194977 A1 | 8/2009 | Sahm | |
| 2010/0207364 A1 * | 8/2010 | Arima et al. | 280/728.2 |
| 2011/0163521 A1 * | 7/2011 | Gammill et al. | 280/728.2 |

FOREIGN PATENT DOCUMENTS

| | | |
|---|---|---|
| DE | 42 93 648 B4 | 4/1995 |
| DE | 695 08 148 T2 | 12/1995 |
| DE | 195 33 707 A1 | 3/1996 |
| DE | 195 38 870 C2 | 4/1997 |
| DE | 298 13 911 U1 | 11/1998 |
| DE | 197 43 615 A1 | 4/1999 |
| DE | 198 50 463 A1 | 5/2000 |
| DE | 299 21 416 U1 | 5/2000 |
| DE | 100 56 835 A1 | 6/2001 |
| DE | 102 25 032 A1 | 1/2004 |
| DE | 103 20 008 B3 | 9/2004 |
| DE | 20 2004 020 096 U1 | 3/2005 |
| DE | 20 2005 009 002 U1 | 8/2005 |
| DE | 601 10 621 T2 | 1/2006 |
| DE | 20 2005 019 368 U1 | 2/2006 |
| DE | 10 2005 004 286 A1 | 8/2006 |
| DE | 10 2005 004 451 A1 | 8/2006 |
| DE | 10 2006 034 740 A1 | 1/2008 |
| EP | 0 769 426 A2 | 4/1997 |
| EP | 0 782 943 A2 | 7/1997 |
| EP | 0 876 942 A2 | 11/1998 |
| GB | 2 323 572 A | 9/1998 |
| JP | 06-219229 | 8/1994 |
| JP | 3037229 | 2/1997 |
| WO | WO-00/06425 | 2/2000 |
| WO | WO-02/28690 A1 | 4/2002 |
| WO | WO-2006/079330 | 8/2006 |

OTHER PUBLICATIONS

International Search Report in PCT/EP2009/063869 dated Mar. 4, 2010.

* cited by examiner

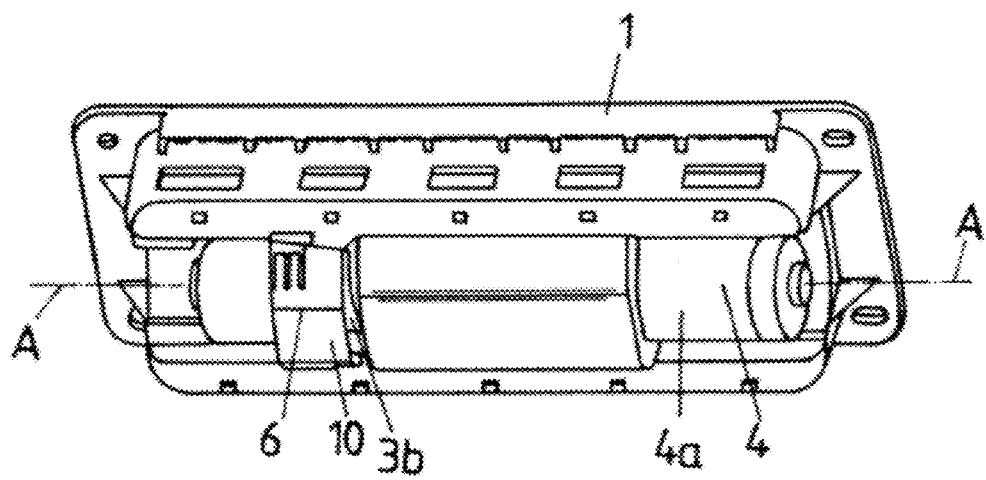
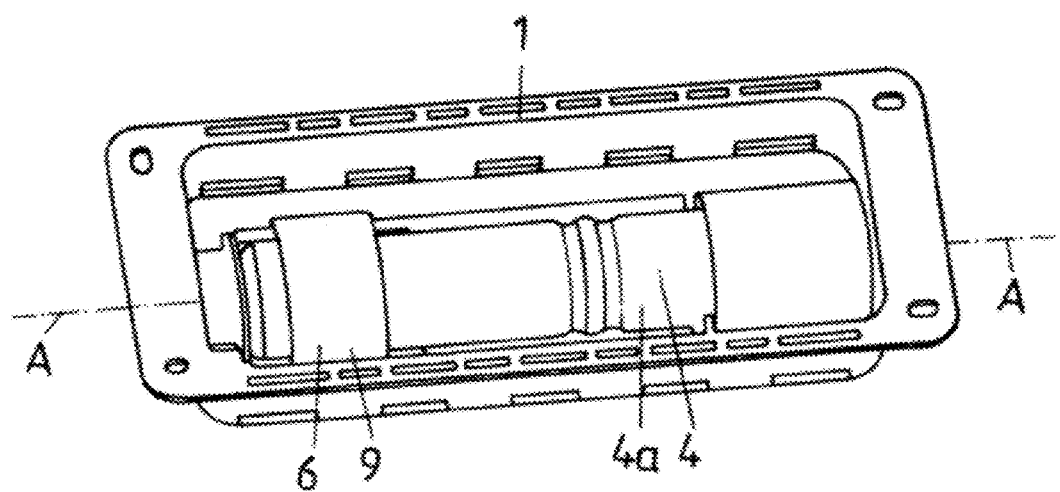

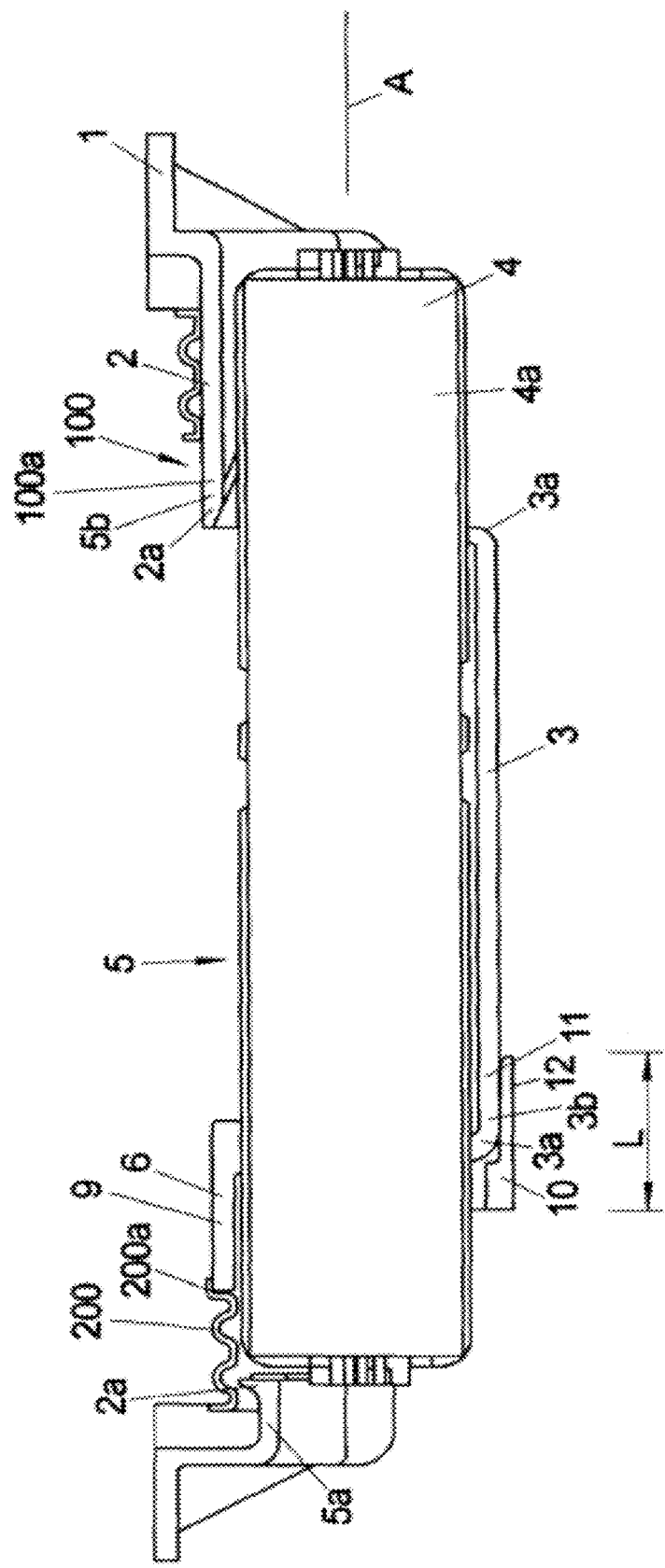

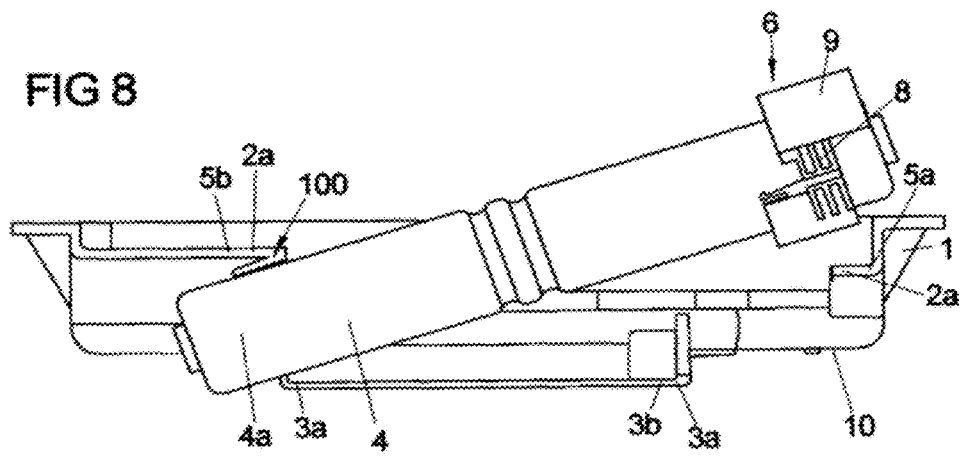
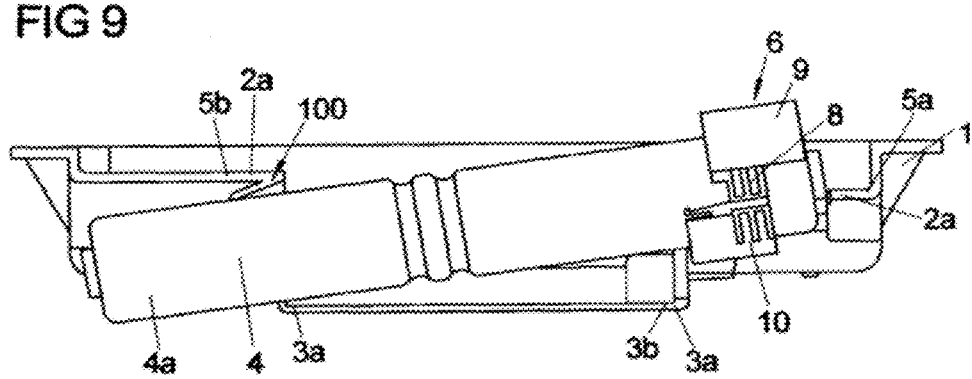
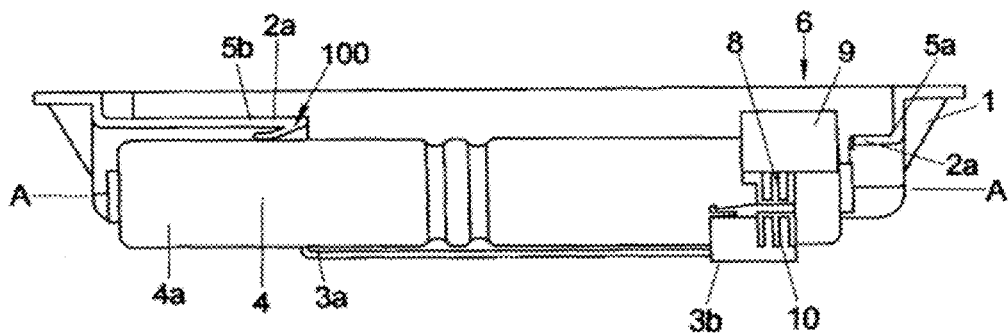

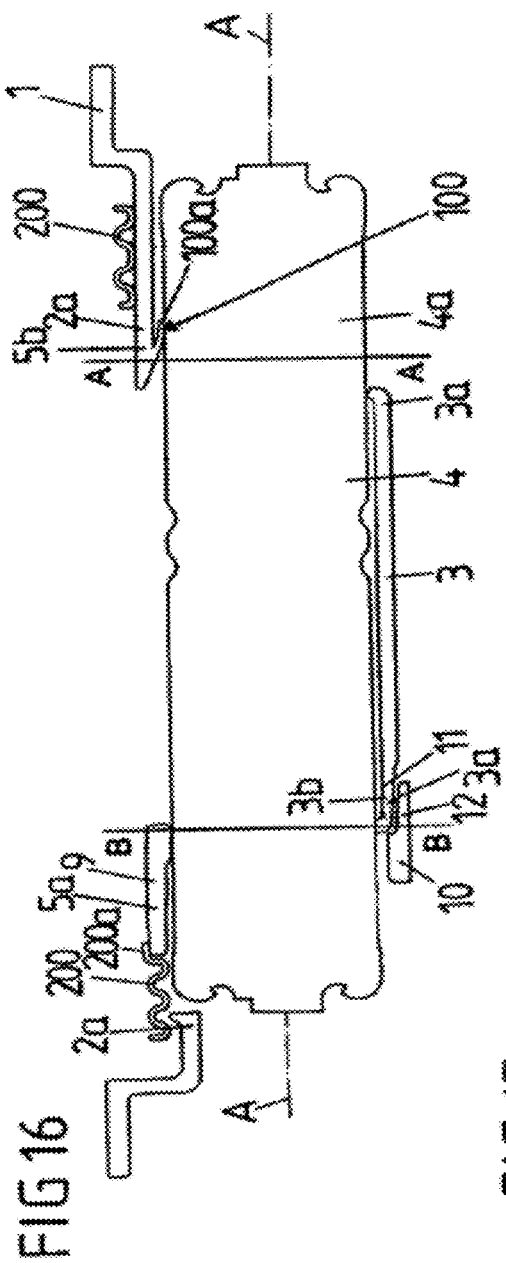
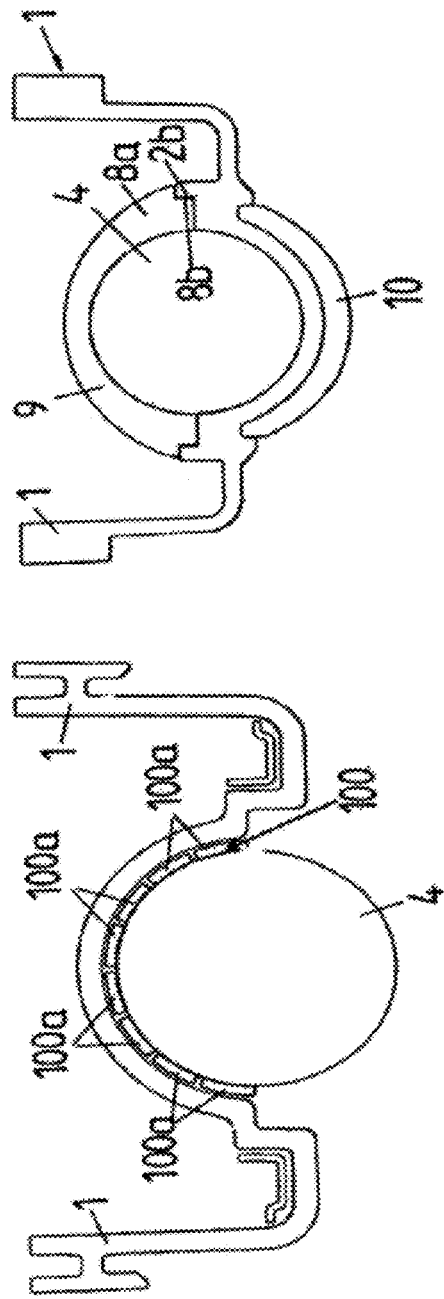
FIG 16
FIG 17
FIG 18

AIRBAG MODULE WITH AN AIRBAG AND A TUBULAR GAS GENERATOR THAT CAN BE FASTENED TO A MODULE HOUSING

CROSS-REFERENCE TO A RELATED APPLICATION

This application is a continuation of International Patent Application Number PCT/EP2009/063869, filed on Oct. 18, 2009, which claims priority of German Patent Application Number 10 2008 056 946.1, filed on Nov. 7, 2008. The foregoing international application is incorporated by reference herein.

BACKGROUND

The invention relates to an airbag module with a tubular gas generator that can be fastened to its module housing.

SUMMARY

The object of the invention is to provide a fastening device for a tubular gas generator which has gas outlet openings along the periphery thereof.

In case of an airbag module with an airbag and the tubular gas generator that can be fastened to a module housing having gas outlet openings along the periphery thereof, the tubular gas generator can be fastened according to the invention to the module housing by means of only a clamping ring that can be moved over the tubular gas generator and over a section of the module housing. This arrangement allows in a simple manner the fastening of a tubular gas generator wherein this kind of fastening requires only little installation space.

When assembling the airbag module the clamping ring (GG-latch ring) is preferably moved over an end of the gas generator (GG). Then the side of the GG on which no latch ring is located is preferably moved diagonally from above into an opening of the module housing. During the insertion the GG is pressed with the side of the ring downwards into the module housing. If the GG has reached a horizontal position in the housing said GG can be aligned with a tool radially and axially (e.g. along its longitudinal axis). If this has occurred, the ring which can be latched is moved inside. Since that ring continues preferably on an inclined plane the ring lowers itself by moving and thus clamps the gas generator tightly. On the side without a ring a spring means or spring element provides preferably the necessary hold and prevents a rattling of the gas generator in the module housing.

It is also possible to lay the airbag (gas bag) around the gas producer (gas generator) and to fasten in this manner the airbag while latching the ring. This however is not valid for vacuum folding.

Exemplary, the spring means is formed from a multitude of separate spring elements, which are arranged one after the other across to the longitudinal axial of the tubular gas generator so that they revolve in their entirety the tubular gas generator sectionally across to its longitudinal axial, in particular around 180 degrees.

It is exemplary provided that the elongated section of the clamping ring reaching over the bottom has a lower thickness than a centre section of the clamping ring and that preferably the elongated section of the clamping ring reaching under the support has a lower thickness than the centre section of the clamping ring.

It is exemplary provided that the module housing has two latch noses and the clamping ring has two assigned deformable latch hooks.

Finally, an airbag in form of a vacuum folded airbag is exemplary fixed separately in the module housing.

BRIEF DESCRIPTION OF THE DRAWINGS

The invention shall be explained in embodiments by the means of the drawings 1 to 18.

FIG. 1 shows a lateral view of an embodiment of an airbag module according to the invention.

FIG. 2 shows a top view of an embodiment of an airbag module according to the invention.

FIG. 3 shows a longitudinal section of a lower section of an airbag module according to the invention.

FIG. 8 shows a further longitudinal section of an embodiment of an airbag module according to the invention.

FIG. 9 shows a further longitudinal section of an embodiment of an airbag module according to the invention.

FIG. 10 shows a further longitudinal section of an embodiment of an airbag module according to the invention.

FIG. 16 shows a further longitudinal section of an embodiment of an airbag module according to the invention.

FIG. 17 shows a further side view of an embodiment of an airbag module according to the invention showing a spring means.

FIG. 18 shows a further side view of an embodiment of an airbag module according to the invention.

DETAILED DESCRIPTION

Figure 4:
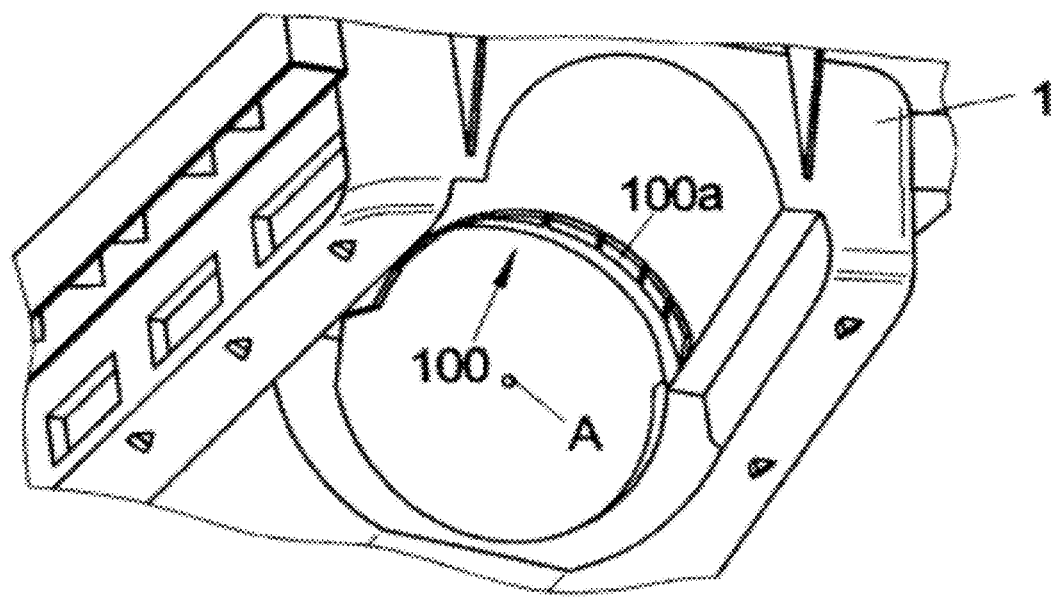
FIG. 4 shows a side view of an embodiment of an airbag module according to the invention showing a spring means.

In the longitudinal sections according to FIGS. 3, 5, 6, 7, 8, 9, 10, 11 and 16 the lower section of a module housing 1 is shown that has a bottom 2 and a support 3 for a tubular gas generator 4.

The module housing 1 has furthermore an opening 5 in bottom 2 which is dimensioned such that the tubular gas generator 4 can be placed from above though the bottom 2 on the support 3. For fastening of the tubular gas generator 4 on the module housing 1 solely a clamping ring 6 is provided which is adapted inside to the geometry of the tubular gas generator 4. For instance FIG. 3 shows the tubular gas generator 4 after its fastening by the clamping ring 6. The clamping ring 6 has a central section 8, an upper elongated section 9 and a lower elongated section 10.

The centre section 8 and the lower elongated section 10 of the clamping ring 6 have together a length L which is smaller than the distance of the edges 2a of the bottom 2 and the edges 3a of the support 3 in direction of the longitudinal axis A of the tubular gas generator 4. The elongated sections 9, 10 have a lower thickness than the centre section 8.

The centre section 8 has on the top an overhang 8*a* pointing during assembly of the clamping ring 6 in direction of the centre of the tubular gas generator 4. In said overhang a recess 8*b* is provided into which a protrusion 2*b* of the bottom 2 engages. Through this a tilting of the clamping ring 6 is prevented during the assembly (compare for instance FIGS. 12 and 18).

Figure 5:
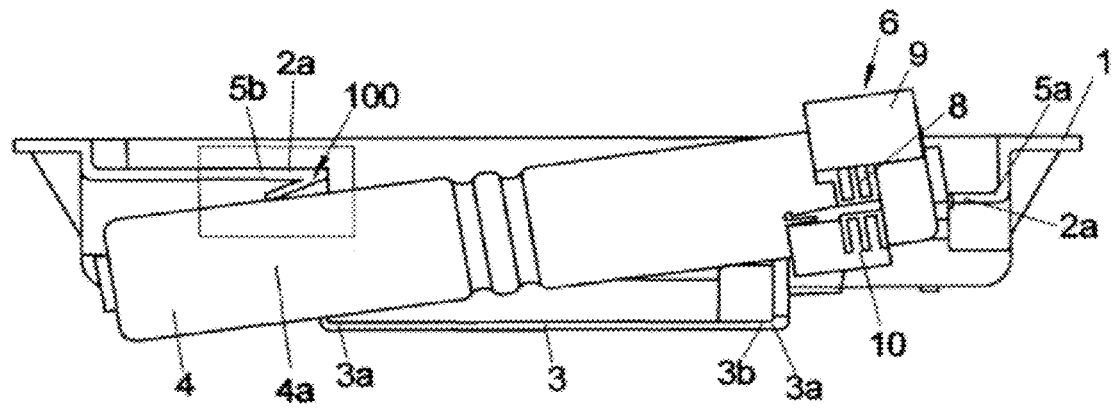
FIG. 5 shows a further longitudinal section of an embodiment of an airbag module according to the invention.
Figure 6:
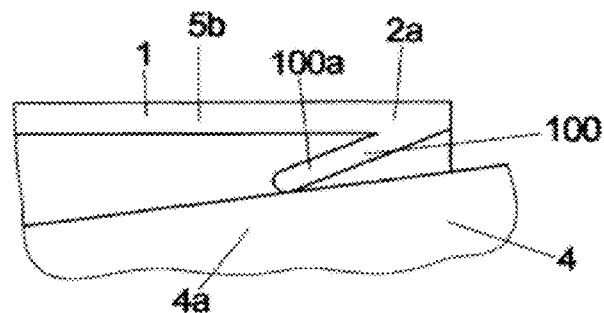
FIG. 6 shows a detailed view of the embodiment of FIG. 5.
Figure 7:
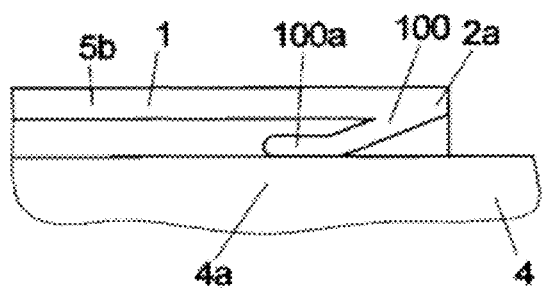
FIG. 7 shows a further detailed view of the embodiment of FIG. 5.
Figure 11:
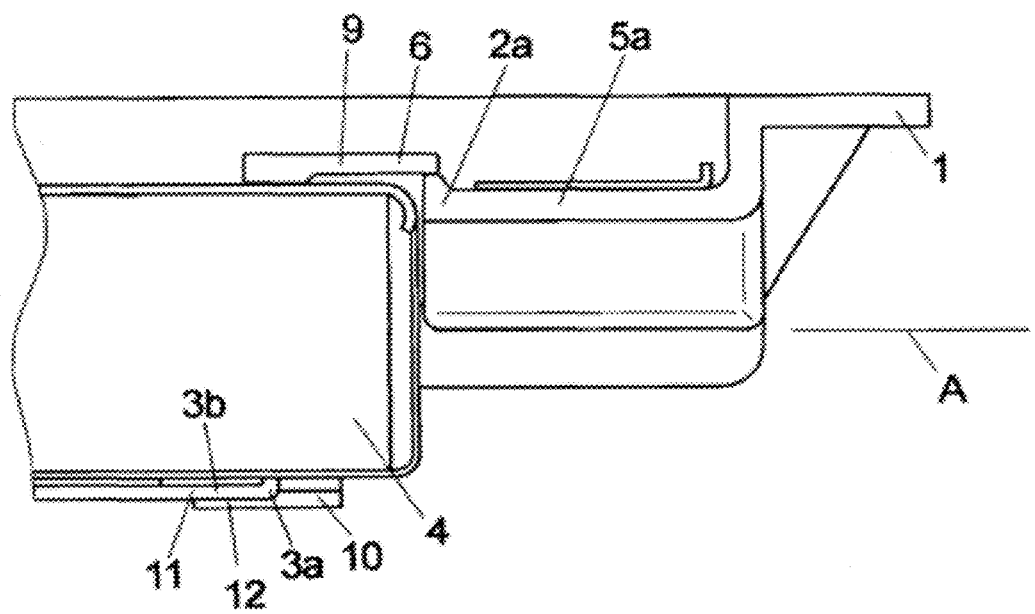
FIG. 11 shows a further detailed view of an embodiment of an airbag module according to the invention.

The assembly of the tubular gas generator 4 occurs in a manner that at first the clamping ring 6 is moved onto the tubular gas generator 4, as shown for instance in FIG. 5 or FIG. 8, whereby the centre section 8 optionally closes approximately with the respected end of the tubular gas generator. On one hand this and due to the mentioned length of the section 8, 10 it is possible that the tubular gas generator 4 can be inserted through the opening 5 into the module housing 1 to the support 3 (compare FIG. 9) and on the other hand if applicable a reaching over of the clamping ring 6 over the bottom 2 is achieved due to the upper elongated section 9 (compare FIG. 11). Subsequently, the clamping ring 6 is moved in direction of the centre of the tubular gas generator 4 so that the elongated section 10 reaches under the support 3 (compare FIG. 10).

Thereby the section 10 can be elastically deformed and the tubular gas generator 4 can be clamped. Since the section 9 reaches still over the bottom 2 of the module housing 1 (compare FIG. 11) or reaches under an edge section 200*a* of a retaining member 200 for fastening of an airbag to the module housing 1 (compare for instance FIG. 16), a sealing between the edge 2*a* and the elongated section 9 is obtained. The support 3 is designed on its end 11 such that a sealing effect between the tubular gas generator 4 and the support 3 and in particular its edge 3*a* is obtained in clamping position of the clamping ring 6, and that the clamping ring 6 has a sealing area against the upper section of the tubular gas generator 4. The sealing area is designed in a known manner, whereby the sealing area can also be designed between the edge 2*a* and the elongated section 9 in such a manner that between both an even smaller gap is provided.

The fastening of the airbag can occur in different ways. Thus, the not shown airbag can loop around the tubular gas generator 4 so that that airbag is fastened in the clamping position of the clamping ring 6 between the tubular gas generator 4 and the support 3. A vacuum folded airbag, also not shown, can be fixed in a known manner separately in a module housing 1, in particular via the mentioned retaining member 200.

According to FIG. 16 the support 3 has preferably an end 11 which tapers towards the outside and continues therefore wedge-shaped in a sectional view. In FIG. 16 said end 11 is shown in a sectional view. The clamping ring 6 is also tapered inwards on an end 12 facing the support 3 so that in the sectional view said end also continues wedge shaped. In FIG. 16 the end 12 is shown in a sectional view. In this embodiment the clamping ring 6 is lowered while moving towards the centre of the tubular gas generator 4 due to the wedge shaped gradient of the ends 11, 12 through which the tubular gas generator 4 is pressed against the support 3 and is therefore clamped.

Figure 12:
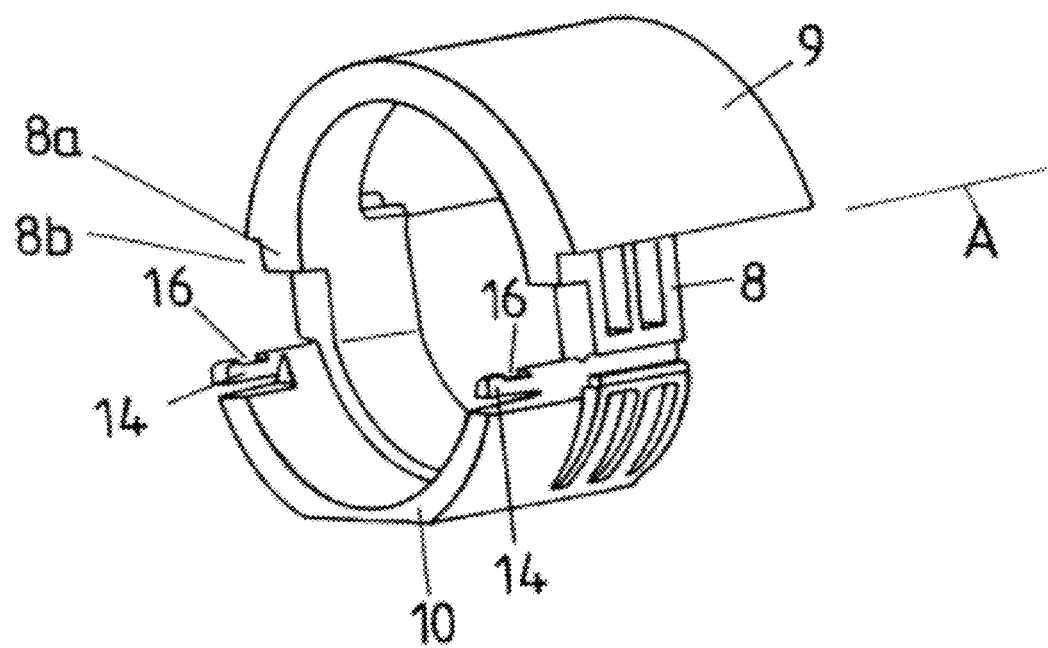
FIG. 12 shows a view of a clamp ring used in an embodiment of an airbag module according to the invention.
Figure 13:
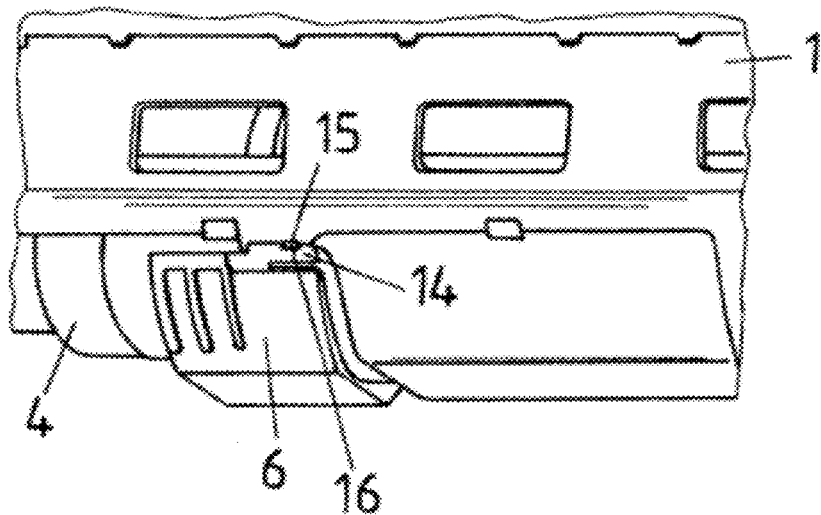
FIG. 13 shows a further view of a clamp ring used in an embodiment of an airbag module according to the invention.
Figure 14:
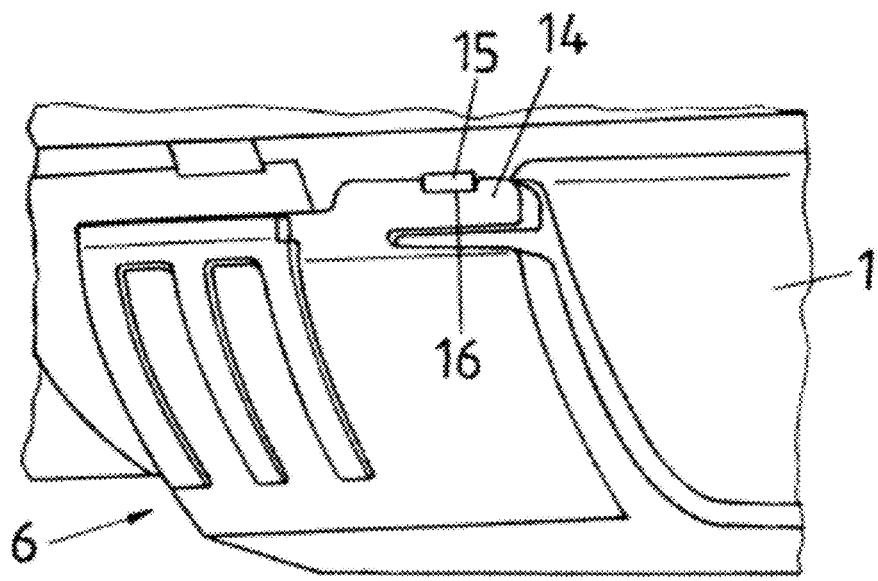
FIG. 14 shows a further view of a clamp ring used in an embodiment of an airbag module according to the invention.
Figure 15:
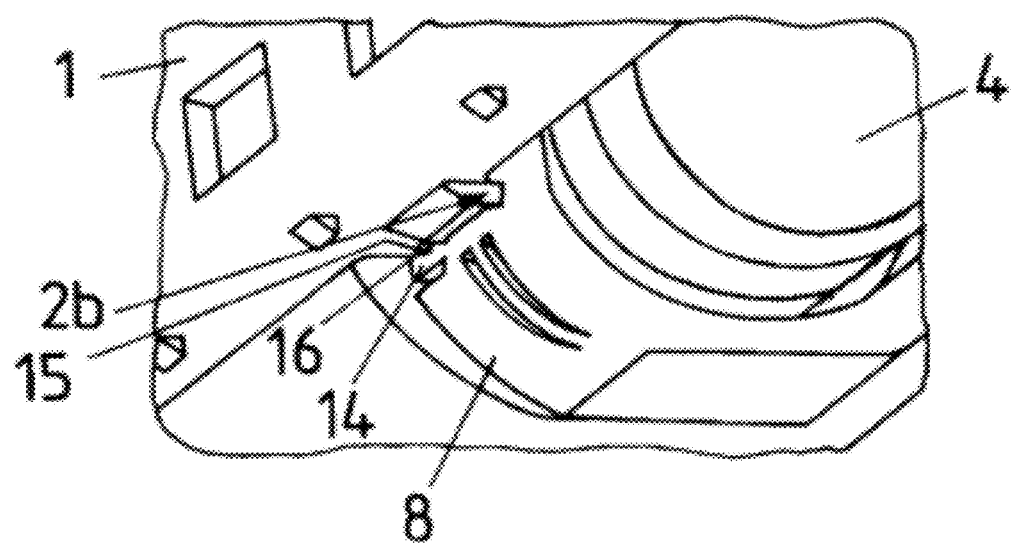
FIG. 15 shows a further view of a clamp ring used in an embodiment of an airbag module according to the invention.

According to FIG. 12 the clamping ring 6 has preferably an elastically deformable latch hook 14 to which a nose 15 is assigned on the module housing 1 (compare FIGS. 13-15). While moving the clamping ring 6 in direction of the centre of the tubular gas generator 4 the latch hook 14 is pressed downwards until the nose 15 engages in a cut-out 16 (FIGS. 14 and 12) of the latch hook 14. In this position the latch hook 14 springs back and the clamping ring 6 is latched.

On the edge 2*a* of the bottom 2 opposing the edge 2*a* of the bottom 2 arranged to the clamping ring 6 along the longitudinal axis A of the tubular gas generator 4 a spring means 100 is provided (compare for instance FIGS. 4 to 7) that preferably revolves around the gas generator 4 (tubular gas generator) in 180° and can be made of separate spring elements 100*a*. In the horizontal position of the tubular gas generator 4 according to FIG. 10 said spring means 100 preloads the tubular gas generator 4 against the support 3. Preferably the spring means 100 or the spring elements 100*a* are formed in one piece to the bottom 2.

The priority application, German Patent Application Number 10 2008 056 946.1, filed on Nov. 7, 2008 is incorporated by reference herein.

The invention claimed is:

1. An airbag module comprising:
an airbag; and
a tubular gas generator fastened to a module housing,
wherein said tubular gas generator has gas outlet openings along the periphery of the tubular gas generator,
wherein the tubular gas generator is fastened to the module housing by only a clamping ring that is movable in an axial direction along the tubular gas generator towards the centre of the tubular gas generator and over a section of the module housing,
wherein the clamping ring has elongated sections separated from one another in an axial direction and extending away from one another in opposite axial directions,
wherein the clamping ring is located around the tubular gas generator,
wherein the module housing has an opening in the bottom of the module housing for inserting the tubular gas generator,
wherein on the module housing below the opening a support for supporting the tubular gas generator is provided, and
wherein the clamping ring is designed such that one of the elongated sections of the clamping ring extends below the support of the module housing to fasten the gas generator to the housing.

2. The airbag module according to claim 1, wherein the support has a lesser length than the tubular gas generator.

3. The airbag module according to claim 2, wherein the clamping ring is designed such that, when the tubular gas generator is fastened to the module housing, another one of the elongated sections extends over the bottom of the module housing and/or under a retaining member by means of which the airbag is fastened to the module housing.

4. The airbag module according to claim 2, wherein on an edge area of the opening of the bottom a spring means is provided that preloads a free end section of the tubular gas generator against the support.

5. The airbag module according to claim 4, wherein the spring means is formed in one piece to the module housing.

6. The airbag module according to claim 4, wherein the spring means revolves around the tubular gas generator perpendicular to the longitudinal axis of the tubular gas generator.

7. The airbag module according to claim 6, wherein the spring means revolves around the tubular gas generator about 180 degrees to the longitudinal axis of the tubular gas generator.

8. The airbag module according to the claim 4, wherein, seen along the longitudinal axis of the tubular gas generator, an edge section of the opening of the bottom of the module housing is opposite to an edge section of the support, to another edge section of the opening of the bottom and/or to an edge section of the retaining member.

9. The airbag module according to claim 2, wherein the ends of the support and the corresponding elongated section of the clamping ring have an inclined surface so that the tubular gas generator is adapted to be fastened between the support and an upper section of the clamping ring by moving the clamping ring in direction of the centre of the tubular gas generator.

10. The airbag module according to claim 1, wherein the clamping ring is designed such that when the tubular gas generator is fastened to the module housing, the one of the elongated sections is positioned under an edge section of the support, and another of the elongated sections is positioned over an edge section of the opening of the bottom of the module housing and/or under an edge section of a retaining member by means of which the airbag is fastened to the module housing.

11. The airbag module according to claim 1, wherein a centre section and a lower elongated section of the clamping ring that is related to the support have together a length which is shorter than the distance between the edges of the bottom and the edges of the support in a direction of the longitudinal axis of the tubular gas generator.

12. The airbag module according to claim 1, wherein the clamping ring and the module housing are designed such as to provide a sealing between the clamping ring and the module housing on the edges of the bottom of the module housing, and wherein the clamping ring and the module housing are designed such as to provide a sealing between the clamping ring and the module housing and the tubular gas generator on the edges of the support and on the edges of a protrusion of the clamping ring.

13. The airbag module according to claim 1, wherein the clamping ring is adapted to be locked to the module housing.

14. The airbag module according to claim 13, wherein the module housing has at least one latch nose and the clamping ring has at least one corresponding flexible latch hook.

15. The airbag module according to claim 1, wherein the airbag loops around the tubular gas generator and wherein, in the clamping position of the clamping ring, the airbag is fixed between the tubular gas generator and the support.

* * * * *

UNITED STATES PATENT AND TRADEMARK OFFICE
CERTIFICATE OF CORRECTION

| | |
|---|---|
| PATENT NO. | : 8,141,898 B2 |
| APPLICATION NO. | : 13/051940 |
| DATED | : March 27, 2012 |
| INVENTOR(S) | : Stefan Hamels et al. |

It is certified that error appears in the above-identified patent and that said Letters Patent is hereby corrected as shown below:

On the Title page, at Item (63), please change Oct. 18, 2009 to Oct. 22, 2009.

Signed and Sealed this
Thirty-first Day of July, 2012

David J. Kappos
*Director of the United States Patent and Trademark Office*